United States Patent [19]

Fütterer et al.

[11] 4,412,146
[45] Oct. 25, 1983

[54] ELECTRIC MOTOR CONTROL

[76] Inventors: Bodo Fütterer, Luzern; Jurgen Mayer; Hugo Fritschy, both of Sachseln, all of Switzerland

[21] Appl. No.: 202,398

[22] Filed: Oct. 30, 1980

Related U.S. Application Data

[63] Continuation of Ser. No. 901,607, May 1, 1978, abandoned, which is a continuation-in-part of Ser. No. 594,768, Jul. 10, 1975, abandoned.

[30] Foreign Application Priority Data

Jul. 13, 1974 [DE] Fed. Rep. of Germany ....... 2433770

[51] Int. Cl.³ .............................................. H02K 1/22
[52] U.S. Cl. ...................................... 310/266; 310/43; 310/90; 310/154
[58] Field of Search ...................... 310/266, 89, 42, 43, 310/154, 40 MM, 50, 171, 138, 90

[56] References Cited

U.S. PATENT DOCUMENTS

| 2,889,475 | 6/1959 | Emerson | 310/171 |
| 3,258,622 | 6/1966 | Gillespie | 310/154 |
| 3,467,847 | 9/1969 | Faulhaber | 310/266 |
| 3,689,787 | 9/1972 | Saretzky | 310/266 |
| 4,210,832 | 7/1980 | Ascoli | 310/43 |

FOREIGN PATENT DOCUMENTS

| 883171 | 6/1953 | Fed. Rep. of Germany | 310/266 |
| 892303 | 8/1953 | Fed. Rep. of Germany | 310/266 |

Primary Examiner—R. Skudy
Attorney, Agent, or Firm—Townsend and Townsend

[57] ABSTRACT

An electric motor construction is described in which the permanent magnet and a flux return element are embedded in a molded structure serving as a face plate and including seats for bearings as well as a bore for the motor shaft.

6 Claims, 4 Drawing Figures

ELECTRIC MOTOR CONTROL

This is a continuation of our pending application Ser. No. 901,607, filed May 1, 1978 which application is a continuation-in-part of our application Ser. No. 594,768, filed July 10, 1975 and now abandoned.

The invention relates to electric motors of the type utilizing a bell-shaped rotor. A permanent magnet providing the field extends into the cabity of the rotor. A cylindrical flux return part is provided which surrounds the rotor.

Motors of the general construction described above in which a permanent magnet is filled with plastic material and is glued to a face plate are known in the art. The assembly is then bored to provide a bearing seat and is connected to a flux return element, for example, by pressing or by rolling in. The production of such an electric motor is expensive and presents problems in achieving proper tolerances.

It is further known to interconnect the permanent magnet and the flux return element by a plastic face plate. This design requires close tolerances of the permanent magnet as well as the flux return element and is likewise costly to produce.

In another known design, the permanent magnet and a face plate of aluminum are secured by plastic injection and the flux return element is rolled around it. The manufacture of such a design is also comparatively expensive.

It is the primary object of the invention to provide a stator for an electric motor of the type mentioned above which can be relatively easily made with close tolerances and is also resistant to corrosion.

This problem is solved by a casing which surrounds the flux return portion and also constitutes a face plate which locates the permanent magnet concentrically to the flux return portion. It encloses the latter, while leaving an aperture on the opposite face of such diameter which corresponds to the inside diameter of the flux return part.

In accordance with a particular embodiment, the casing comprises an injection molded element which is preferably pressure molded zinc or plastic. The latter way, for example, be of glass fiber reinforced material marketed under the trade name "Polyamide 12".

In the aforementioned embodiment, the plastic or metal casing is provided with at least one bearing seat.

The molding operation may be carried out with less problems if a seal is used which closes the annular gap between the permanent magnet and the flux return part at the face plate. The flux return portion has, preferably, at least one continuous longitudinal slot. It may also have an inwardly extending bias. In this manner, a close tolerance of the air gap may be obtained.

It is advantageous to arrange each longitudinal slot symmetrically to the lines of flux of the permanent magnet so that no bypass of the lines of flux may occur through the longitudinal slots.

Alternatively, the casing may consist of a pot-shaped metal part which surrounds and locates the cover of the brush.

Another feature of the aforementioned improvement consists of providing the flux return part with a continuous longitudinal slot and an outwardly directed bias. Thus, it is ensured that the flux return part is always in close contact with the pot-shaped metal element. This leads to a good heat transfer and permits calibration of the air gap by radial compression of the pot-shaped metal element.

A particularly simple method of manufacturing a stator for the motor, in accordance with the invention, resides in the steps of sliding the permanent magnet into the interior of a calibrated tube, the cross section of which corresponds to that of the air gap space and sliding the flux return part over this calibrated tube; thereafter, placing the sealing ring onto the front edges at the face plate side of both of these parts, and placing the entire assembly in a casting mold and surrounding it by injecting plastic material. In this way, the injection mass is prevented from penetrating into the air gap space so that supplementary finishing is unnecessary.

An improvement in this method consists of using a casting mold which contains protruding elements corresponding to the longitudinal bore for the rotor shaft and seats for the bearing. The bearing seats so produced lead to precisely aligned bearings, particularly if the casing is made from glass fiber reinforced Polyamide 12.

The following description of certain embodiments of the invention should be considered in connection with the schematic representations in the annexed drawings, in which.

Figure 1:
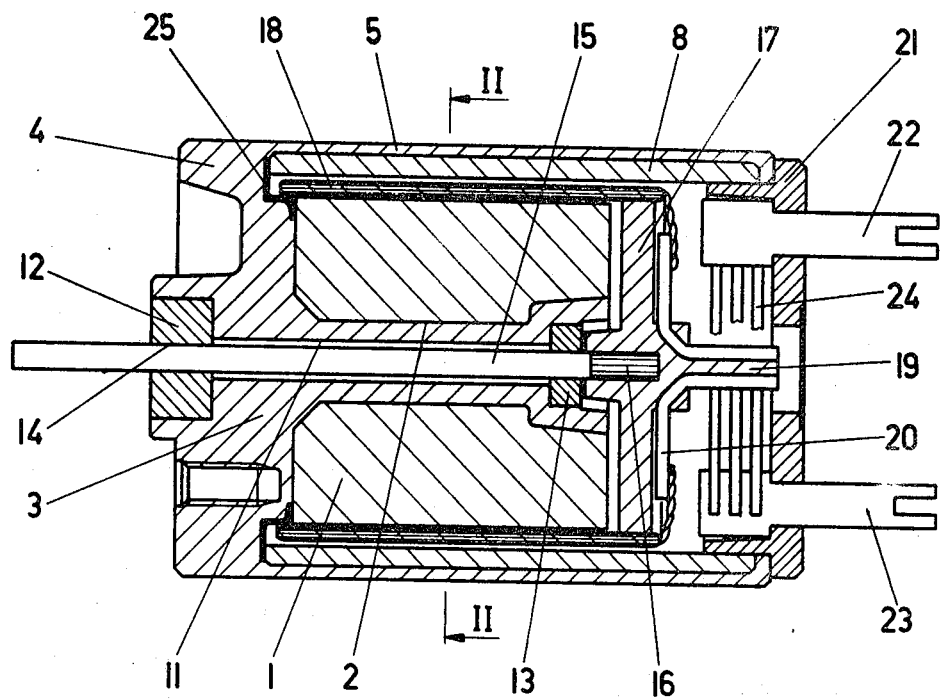
FIG. 1 is a cross sectional view through a motor in accordance with the invention.
Figure 2:
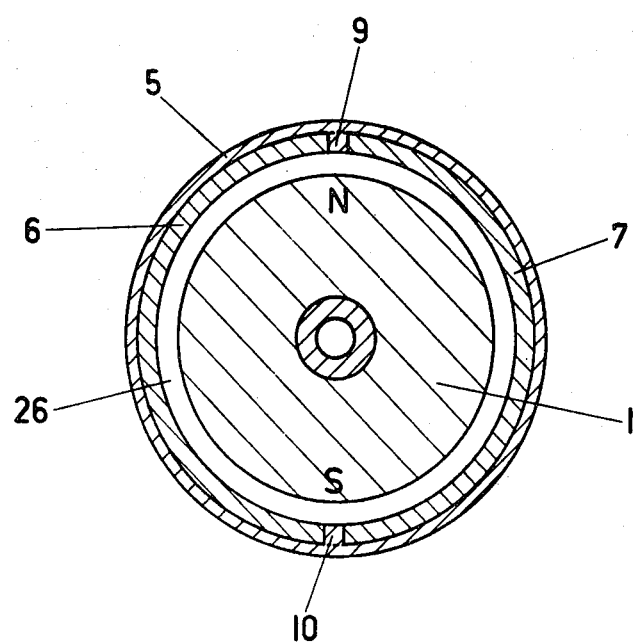
FIG. 2 is a sectional view along line II—II of FIG. 1 with the rotor removed.

The motor illustrated in FIGS. 1 and 2 includes a cylindrical permanent magnet 1 which is provided with a central aperture 2. The magnet 1 is embedded in an injection-molded element 3 which extends through the central aperture 2 and forms the face plate 4 of the housing as well as the outer casing 5. This casing surrounds a flux return element which consists of two cylindrical half shells 6 and 7. These are separated from one another in an axial direction by means of slots 9 and 10. The latter are filled by the injection molding mass and in this manner are solidly held, preventing any displacement of the shell halves 6 and 7.

The injection molded element 3 is provided with a central bore 11 which extends throughout the length thereof. At both ends, the bore is of larger diameter, forming seats to receive bearings 12 and 13. These bearings have bores 14 which receive the shaft 15. On the right end, the shaft 15 has a fluted region 16. Around this, a plastic disc 17 is injected which, at its outer periphery, carries a rotor winding 18. A commutator 19 is attached to the extension of the shaft 15. The commutator 19 comprises a number of L-shaped metal strips 20 which are connected to taps or connecting leads of the rotor winding 18.

A brush cover 21, provided with two terminal strips 22 and 23, is positioned at the free end of the casing 5. Brush springs 24 are fixed to the strips 22 and 23 which bear against the commutator 19.

The shell halves 6 and 7, constituting the flux return part 8, are of a ferromagnetic material. An annular seal 25 abuts against the front edges of the flux return part at the face plate side as well as at the end of the permanent magnet so as to prevent penetration of the injected material into the air gap space during manufacture.

An electric motor of the above type may be manufactured simply and with a tightly toleranced air gap between the permanent magnet 1 and the flux return part 8. The shell halves 6 and 7 may be produced by rolling strips of sheet material.

By way of example, in the manufacture of the stator of a motor of the above type, a tubular part is placed around the permanent magnet 1 which corresponds in its radial dimension to the dimension of the desired air gap. Both shell halves 6 and 7 are then placed around the tubular part. Thereafter, the sealing ring 25 is placed on the end faces of the flux return part and of the permanent magnet. This assembly is then placed in a suitably shaped casting mold. The shell halves 6 and 7 should be so dimensioned as to have a somewhat smaller inner radius than that which corresponds to the outside diameter of the tubular part. In this manner they closely abut against the tubular part in the region of the slots 9 and 10 so that injection molding material is prevented from penetrating therebetween. The casting mold is shaped in such manner that the central bore 11 and the seats for the bearings 12 and 13 are formed during the injection process, and thus need not be made subsequently.

It may be seen from FIG. 2 that the slots 9 and 10 lie opposite the north and south poles of the permanent magnet 1. Such an arrangement ensures that the magnetic flux in the annular air gap space 26 is not weakened.

By embedding the permanent magnet 1 and the two shell halves 6 and 7 of the flux return part 8 in the injection molding material, a precisely coaxial location of these elements is ensured with respect to one another. Metal or plastic may be employed as injection molding material. Polyamide 12, also known by the trade name "Grilamid", has been found to be particularly satisfactory.

The flux return part 8 may be made of a material which permits high inductance, so that comparatively thin shell halves 6 and 7 are sufficient. For example, a tubular flux return part that has no longitudinal slots may be used. This alternate construction is illustrated in FIG. 2 by broken lines covering the slots 9 and 10.

Figure 3:
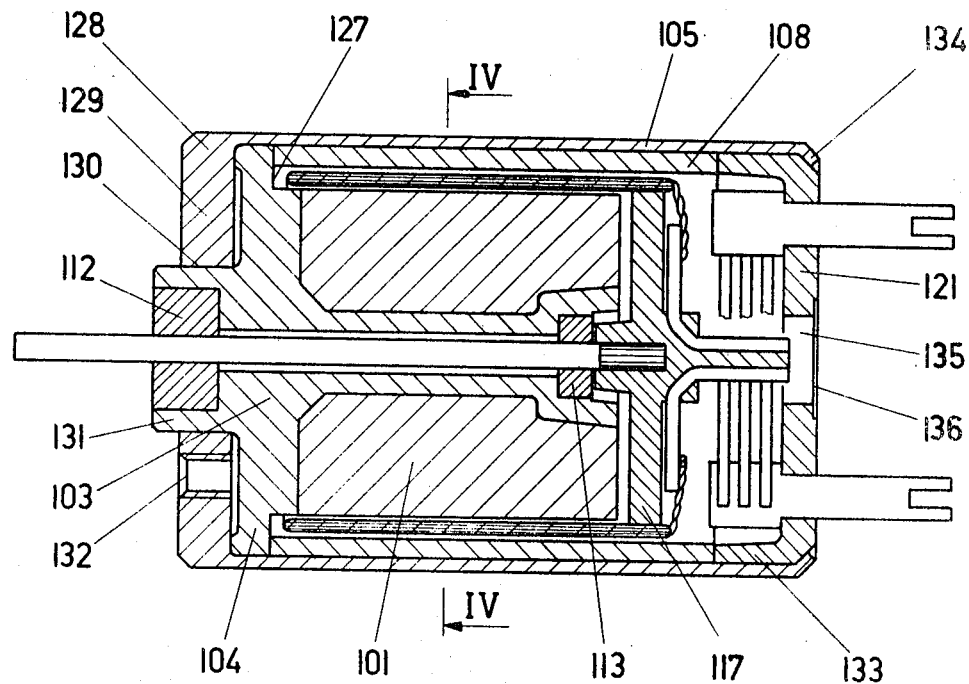
FIG. 3 is a cross sectional view of another embodiment of a motor in accordance with the invention.
Figure 4:
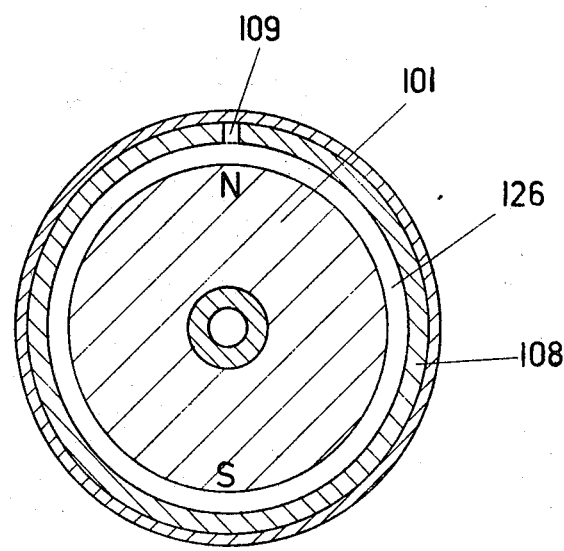
FIG. 4 is a sectional view along line IV—IV of FIG. 3 with the rotor removed.

FIGS. 3 and 4 show another embodiment of an electrical motor in which parts identical with those in FIGS. 1 and 2 are identified by like reference numbers increased by 100.

The electric motor according to FIG. 3 differs mainly from the embodiment shown in FIG. 1 in that only the permanent magnet 101 is embedded in the injection molding material 103. The flux return part 108 is formed as an integral part having a gap 109 which lies opposite to the north pole of the magnet 101.

The injection molded element 103 is provided with a bearing surface 127 extending normally to the axis of the motor which serves as an abutment for the adjacent end face of the flux return part 108. This abutment ensures that the flux return part lies paraxially to the axis of the machine.

The casing 105 forms the outer covering surface of the integral pot-shaped deep drawn element 128, the front end face 129 of which is provided with a bore 130 through which the boss shaped end 131 of the injection molded part 103 extends. Tap holes 132 are cut in the front end face 129 to serve for the fastening of the electric motor.

The brush cover 121 is also pot shaped and has a rim portion 133, the outer diameter of which roughly corresponds to the maximum diameter of the injection molded part 103.

The free end face 134 of the element 128 is deformed obliquely inwards, whereby the injection molded part 103, the flux return part 108, and the brush cover 121 are held solidly clamped together in their positions.

The remaining components correspond to those of the motor in FIG. 1.

In manufacturing a motor illustrated in FIGS. 3 and 4, first of all, an assembly is made which comprises the injection molded part 103, the permanent magnet 101 embedded in it, and the bearings 112 and 113. This assembly is then inserted into the pot-shaped deep drawn element 128, while the open end face 134 of which is not bent until it abuts against the front end face 129. Thereafter, the flux return part 108, at the outer surface to which adhesive may be applied, is inserted into the deep drawn element 128 until it abuts against the supporting surface 127 of the injection molded part 103. Preferably, the flux return part should have a radially outwardly directed bias so that, in its unassembled condition, it has a greater outer diameter than the inner diameter of the deep drawn element. By this, it is ensured that the flux return part abuts closely against the inner surface of the casing 105.

It is not necessary to use adhesive when inserting the flux return part into the casing. However, the rigidity, as well as the heat transfer coefficient between both these parts, would thereby be improved.

The finished rotor is now inserted into the assembled elements and thereafter the brush cover 121 is placed into the casing 105, followed by bending the open edge 134 inwardly so that the flux return part is tightly clamped between the injection molded element 103 on the one hand, and the brush cover 121 on the other hand.

To facilitate the assembly, a central aperture 135 is provided in the brush cover 121. This can be closed by a thin removable disc 136.

The construction, as described above, has the advantage that the size of the annular air gap 126 can be reduced by rolling or compressing the casing in the region of the flux return part 108. In this manner, the characteristics of the motor are modified without the need of using alternate constructional parts. Also, motors with closely toleranced characteristics may thus be manufactured without great expense.

The invention has been described with respect to commutator type motors. However, it should be understood that it is not restricted thereto, but is applicable to a great variety of types of motors.

What is claimed is:

1. An electric motor having a bell-shaped rotor and a generally cylindrical stator, the rotor being positioned in an air gap between spaced inner and outer concentric portions of the stator, the stator comprising:
   a generally cylindrical permanent magnet, said magnet having a central axial aperture, said magnet defining the inner portion of the stator;
   an injection molded element, said injection molded element positioning said magnet in said motor, said molded element having a first portion positioned in, and conforming in shape to, said aperture of said magnet, and having a second portion forming a face plate which engages a first end of said magnet and which extends radially outwardly beyond the periphery of said magnet, said first portion of said molded element having a central bore positioned on the axis of said magnet, said central bore having end portions which carry bearings, said bearings supporting a shaft which passes through said central bore in said injection molded element, said shaft supporting the bell-shaped rotor for rotation in the air gap;

a flux return element concentric with, and spaced radially outwardly from said magnet to define the air gap in which the bell-shaped rotor is positioned, said flux return element being cylindrical with a first end of said flux return element contacting said face plate radially outwardly of said magnet;

a casing, said casing extending from said face plate radially outwardly of, and in intimate engagement with said flux return element, said casing extending beyond a second end of said magnet and terminating in a radially inwardly turned free end, said free end extending radially inwardly to an extent not exceeding an inner diameter of said flux return element; and, a brush cover, a wall portion of said cover contacting a second end of said flux return element, said radially inwardly turned free end of said casing engaging said wall portion of said brush cover to secure said cover to said casing.

2. The electric motor of claim 1 wherein said flux return element has at least one longitudinally extending slot located in the plane of symmetry of the flux lines of said magnet and further wherein said casing engages said at least one longitudinally extending slot in said flux return element.

3. The electric motor of claim 1 wherein a first free end of said casing extends radially inwardly to an extent not exceeding the inner diameter of said flux return ring and further wherein a second free end of said casing extends radially inwardly and engages said face plate.

4. The electric motor of claim 1 wherein said casing and said face plate are integral.

5. The electric motor of claim 2 wherein a first free end of said casing extends radially inwardly to an extent not exceeding the inner diameter of said flux return ring and further wherein a second free end of said casing extends radially inwardly and engages said face plate.

6. The electric motor of claim 2 wherein said casing and said face plate are integral.

* * * * *